United States Patent [19]
Vinekar et al.

[11] Patent Number: 5,581,310
[45] Date of Patent: Dec. 3, 1996

[54] ARCHITECTURE FOR A HIGH DEFINITION VIDEO FRAME MEMORY AND AN ACCOMPANYING DATA ORGANIZATION FOR USE THEREWITH AND EFFICIENT ACCESS THEREFROM

[75] Inventors: Sanjay R. Vinekar, Cranbury, N.J.; Lawrence A. Pearlstein, Newtown; Michael A. Plotnick, Southampton, both of Pa.; Joseph E. Augenbraun, Princeton, N.J.

[73] Assignee: Hitachi America, Ltd., Tarrytown, N.Y.

[21] Appl. No.: 378,487

[22] Filed: Jan. 26, 1995

[51] Int. Cl.$^6$ .................................................. H04N 9/64
[52] U.S. Cl. .......................... 348/718; 348/719; 345/200; 365/230.03
[58] Field of Search ................................ 348/714–719, 348/445, 556; 345/185, 200; 365/189.01, 230.03; H04N 9/64

[56] References Cited

U.S. PATENT DOCUMENTS

| | | | |
|---|---|---|---|
| 4,811,099 | 3/1989 | Hedley et al. | 348/718 |
| 5,105,280 | 4/1992 | Ogino et al. | 358/459 |
| 5,183,024 | 11/1992 | Heilveil et al. | 345/200 |
| 5,212,666 | 5/1993 | Takeda | 365/230.03 |
| 5,268,682 | 12/1993 | Yang et al. | 345/200 |
| 5,321,425 | 6/1994 | Chia et al. | 345/200 |
| 5,406,311 | 4/1995 | Michelson | 345/200 |

*Primary Examiner*—Victor R. Kostak
*Attorney, Agent, or Firm*—Michaelson & Wallace; Peter L. Michaelson

[57] ABSTRACT

An architecture for a memory with a wide word, e.g. n-byte, width particularly suited for use as a high definition video frame store memory (80), and an accompanying organization for storing pixel data therein to facilitate efficient block and raster access therefrom. Specifically, the memory relies on storing n-byte wide words ($n=(m_1 \times m_2)$) across $m_2$ independent $m_1$-byte wide memory segments, with pre-defined positional offsets between respective $m_1$-byte words (203)("nibbles") stored in successive memory segments. All these segments are simultaneously accessed on a read or write basis. During a memory write operation, all the nibbles in an n-byte wide input word are appropriately shuffled to yield the proper inter-segment offsets prior to being written into the memory as a collective n-byte memory write word. During a read operation, all the nibbles read from memory in a collective n-byte memory read word are appropriately shuffled to yield an n-byte output word. Inasmuch as either a scan line or sub-block ($210_W$, $210_X$, $210_Y$, $210_Z$) of a macroblock of pixel data is collectively written to or read from the memory during one memory write or read operation, with shuffling occurring on a pipelined basis therewith, each of these two widely differing forms of memory access can each occur at a very high efficiency and hence at essentially full memory bandwidth. This permits that memory to be fabricated from relatively inexpensive memory circuits.

34 Claims, 9 Drawing Sheets

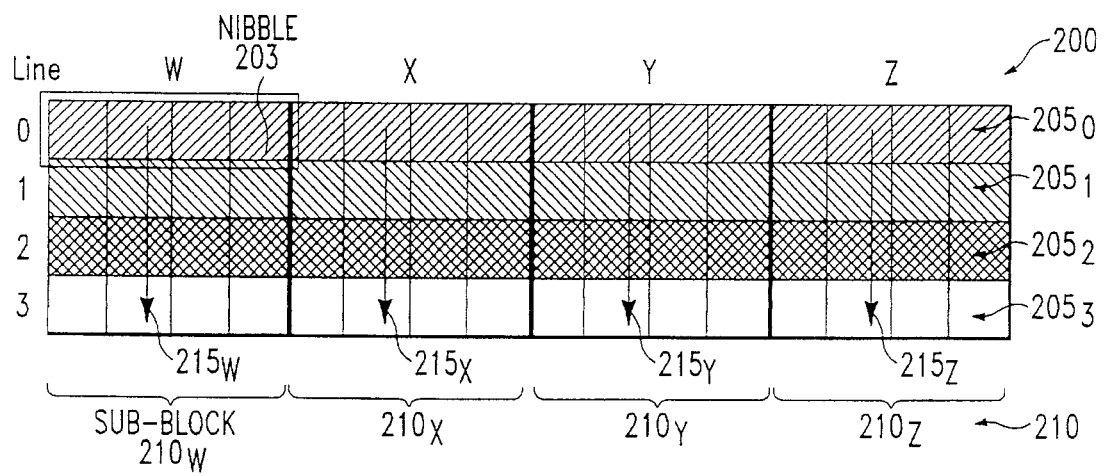
FIG. 2A – IMAGE DATA
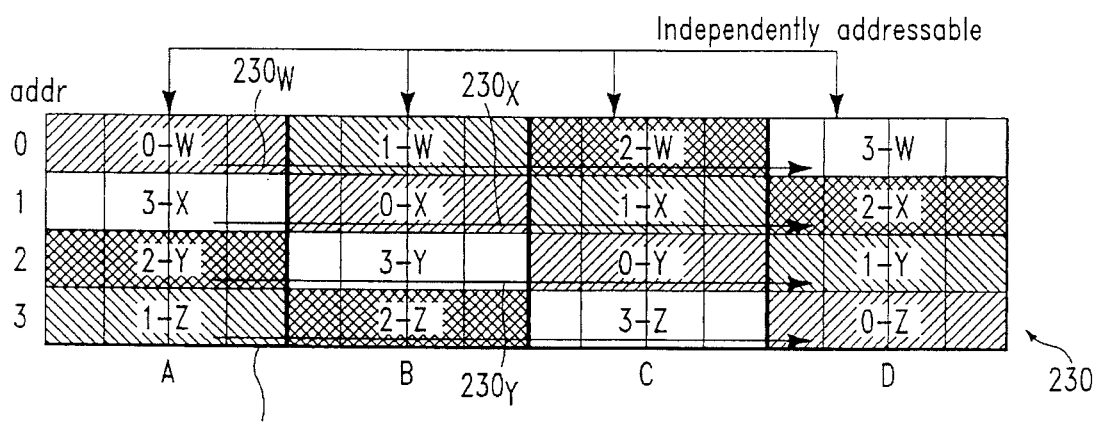
FIG. 2B – STORED MEMORY DATA
| A addr | B addr | C addr | D addr | A data | B data | C data | D data |
|---|---|---|---|---|---|---|---|
| 0 | 1 | 2 | 3 | 0-W | 0-X | 0-Y | 0-Z |
FIG. 3A – 16X1 (SCAN)
| A addr | B addr | C addr | D addr | A data | B data | C data | D data |
|---|---|---|---|---|---|---|---|
| 0 | 0 | 0 | 0 | 0-W | 1-W | 2-W | 3-W |
FIG. 3B – 4x4 (SEGMENT) READ

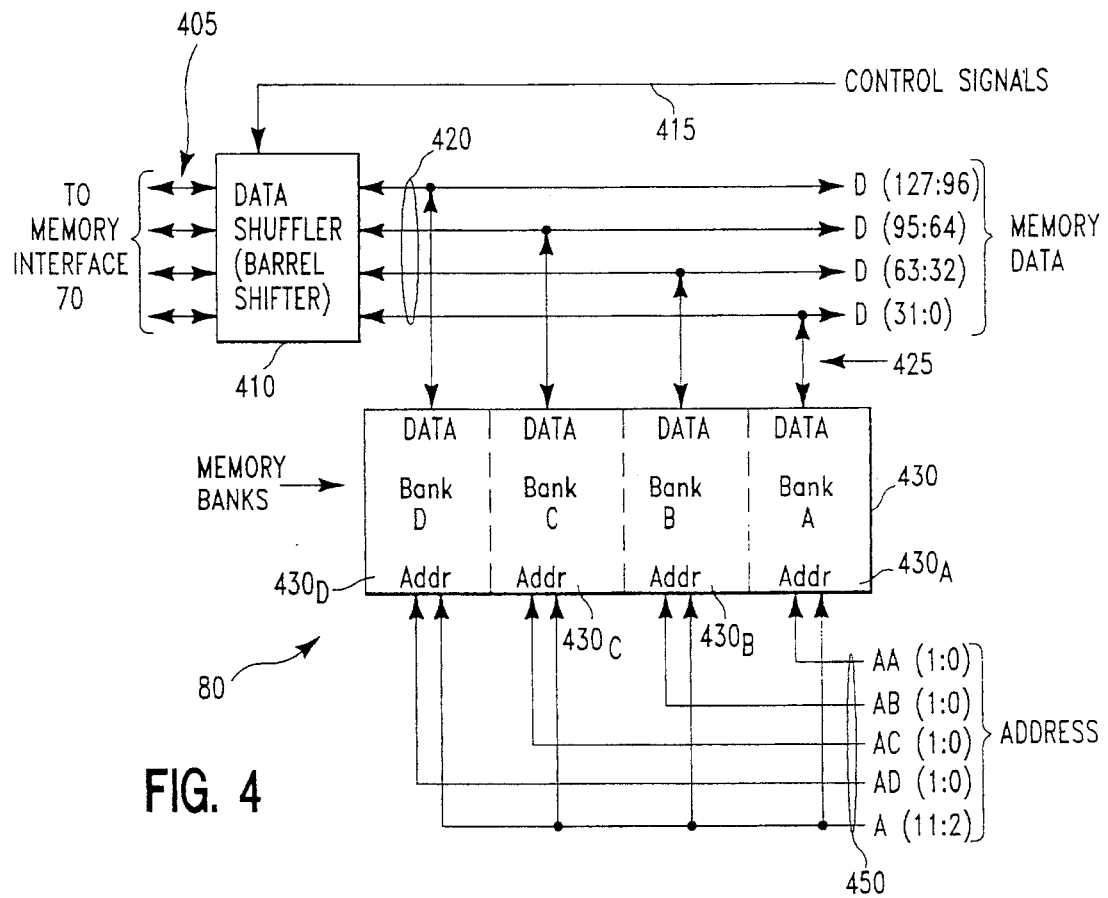
FIG. 4
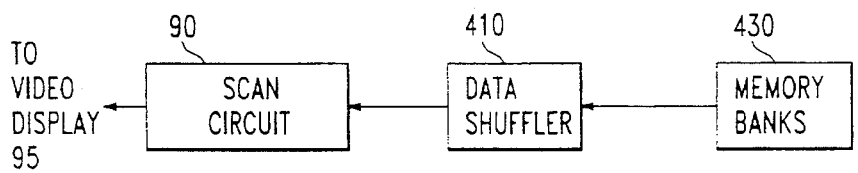
FIG. 5A - DATA PATH FOR SCANNING
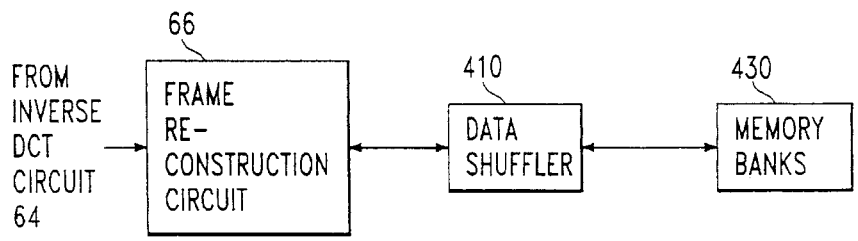
FIG. 5B - DATA PATH FOR FRAME RECONSTRUCTION

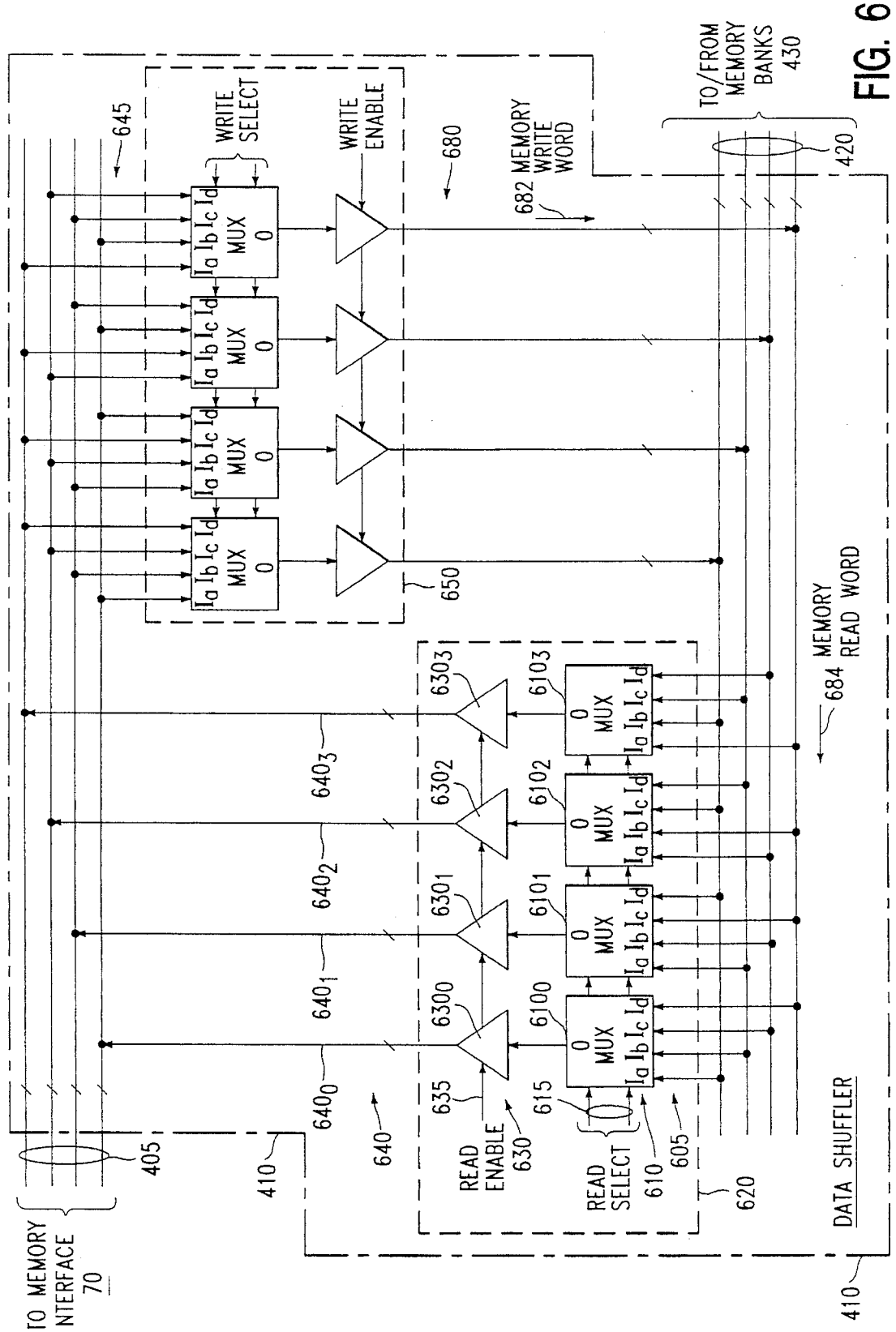

MACROBLOCKS FOR INTERLACED
LUMINANCE DATA

Odd Buffer Page 0 (Bank 0)

| Loc. | A | B | C | D |
|---|---|---|---|---|
| 0 | M1 W0 O0 | M1 W0 O1 | M1 W0 O2 | M1 W0 O3 |
| 1 | M1 X0 O3 | M1 X0 O0 | M1 X0 O1 | M1 X0 O2 |
| 2 | M1 Y0 O2 | M1 Y0 O3 | M1 Y0 O0 | M1 Y0 O1 |
| 3 | M1 Z0 O1 | M1 Z0 O2 | M1 Z0 O3 | M1 Z0 O0 |
| 4 | M2 W0 O0 | M2 W0 O1 | M2 W0 O2 | M2 W0 O3 |
| 5 | M2 X0 O3 | M2 X0 O0 | M2 X0 O1 | M2 X0 O2 |
| 6 | M2 Y0 O2 | M2 Y0 O3 | M2 Y0 O0 | M2 Y0 O1 |
| 7 | M2 Z0 O1 | M2 Z0 O2 | M2 Z0 O3 | M2 Z0 O0 |

Even Buffer Page 0 (Bank 0) — 800

| Loc. | A | B | C | D |
|---|---|---|---|---|
| 0 | M1 W0 E0 | M1 W0 E1 | M1 W0 E2 | M1 W0 E3 |
| 1 | M1 X0 E3 | M1 X0 E0 | M1 X0 E1 | M1 X0 E2 |
| 2 | M1 Y0 E2 | M1 Y0 E3 | M1 Y0 E0 | M1 Y0 E1 |
| 3 | M1 Z0 E1 | M1 Z0 E2 | M1 Z0 E3 | M1 Z0 E0 |
| 4 | M2 W0 E0 | M2 W0 E1 | M2 W0 E2 | M2 W0 E3 |
| 5 | M2 X0 E3 | M2 X0 E0 | M2 X0 E1 | M2 X0 E2 |
| 6 | M2 Y0 E2 | M2 Y0 E3 | M2 Y0 E0 | M2 Y0 E1 |
| 7 | M2 Z0 E1 | M2 Z0 E2 | M2 Z0 E3 | M2 Z0 E0 |

FIG. 8

Odd Buffer Page 1 (Bank 1)

| Loc. | A | B | C | D |
|---|---|---|---|---|
| 0 | M1 W1 O0 | M1 W1 O1 | M1 W1 O2 | M1 W1 O3 |
| 1 | M1 X1 O3 | M1 X1 O0 | M1 X1 O1 | M1 X1 O2 |
| 2 | M1 Y1 O2 | M1 Y1 O3 | M1 Y1 O0 | M1 Y1 O1 |
| 3 | M1 Z1 O1 | M1 Z1 O2 | M1 Z1 O3 | M1 Z1 O0 |
| 4 | M2 W1 O0 | M2 W1 O1 | M2 W1 O2 | M2 W1 O3 |
| 5 | M2 X1 O3 | M2 X1 O0 | M2 X1 O1 | M2 X1 O2 |
| 6 | M2 Y1 O2 | M2 Y1 O3 | M2 Y1 O0 | M2 Y1 O1 |
| 7 | M2 Z1 O1 | M2 Z1 O2 | M2 Z1 O3 | M2 Z1 O0 |

Even Buffer Page 1 (Bank 1) — 900

| Loc. | A | B | C | D |
|---|---|---|---|---|
| 0 | M1 W1 E0 | M1 W1 E1 | M1 W1 E2 | M1 W1 E3 |
| 1 | M1 X1 E3 | M1 X1 E0 | M1 X1 E1 | M1 X1 E2 |
| 2 | M1 Y1 E2 | M1 Y1 E3 | M1 Y1 E0 | M1 Y1 E1 |
| 3 | M1 Z1 E1 | M1 Z1 E2 | M1 Z1 E3 | M1 Z1 E0 |
| 4 | M2 W1 E0 | M2 W1 E1 | M2 W1 E2 | M2 W1 E3 |
| 5 | M2 X1 E3 | M2 X1 E0 | M2 X1 E1 | M2 X1 E2 |
| 6 | M2 Y1 E2 | M2 Y1 E3 | M2 Y1 E0 | M2 Y1 E1 |
| 7 | M2 Z1 E1 | M2 Z1 E2 | M2 Z1 E3 | M2 Z1 E0 |

FIG. 9

FIG. 10 - MACROBLOCK WRITE

FIG. 11 – MACROBLOCK READ

FIG. 12 - RASTER SCAN READ

| | DATA SHUFFLER OUTPUT AND SCAN CIRCUIT INPUT | | | | OUTPUT FROM MEMORY BANKS AND DATA SHUFFLER INPUT | | | | MEMORY ADDRESS | | | | |
|---|---|---|---|---|---|---|---|---|---|---|---|---|---|
| t | A D(127:96) | B D(95:64) | C D(63:32) | D D(31:0) | A D(127:96) | B D(95:64) | C D(63:32) | D D(31:0) | AD | AC | AB | AA | page 0 (line 0) |
| 0 | M1 W0 00 | | | | | | | | | | | | addr 0 |
| 1 | M2 W0 00 | M1 X0 00 | M1 Y0 00 | M1 Z0 00 | M1 W0 00 | M1 X0 00 | M1 Y0 00 | M1 Z0 00 | 00 | 01 | 10 | 11 | addr 4 |
| 2 | M3 W0 00 | M2 X0 00 | M2 Y0 00 | M2 Z0 00 | M2 W0 00 | M2 X0 00 | M2 Y0 00 | M2 Z0 00 | 00 | 01 | 10 | 11 | addr 8 |
| 3 | M4 W0 00 | M3 X0 00 | M3 Y0 00 | M3 Z0 00 | M3 W0 00 | M3 X0 00 | M3 Y0 00 | M3 Z0 00 | 00 | 01 | 10 | 11 | addr 12 |
| 4 | M5 W0 00 | M4 X0 00 | M4 Y0 00 | M4 Z0 00 | M4 W0 00 | M4 X0 00 | M4 Y0 00 | M4 Z0 00 | 00 | 01 | 10 | 11 | addr 16 |
| 5 | M6 W0 00 | M5 X0 00 | M5 Y0 00 | M5 Z0 00 | M5 W0 00 | M5 X0 00 | M5 Y0 00 | M5 Z0 00 | 00 | 01 | 10 | 11 | addr 20 |
| 6 | M7 W0 00 | M6 X0 00 | M6 Y0 00 | M6 Z0 00 | M6 W0 00 | M6 X0 00 | M6 Y0 00 | M6 Z0 00 | 00 | 01 | 10 | 11 | addr 24 |
| 7 | M8 W0 00 | M7 X0 00 | M7 Y0 00 | M7 Z0 00 | M7 W0 00 | M7 X0 00 | M7 Y0 00 | M7 Z0 00 | 00 | 01 | 10 | 11 | addr 28 |
| 8 | | M8 X0 00 | M8 Y0 00 | M8 Z0 00 | M8 W0 00 | M8 X0 00 | M8 Y0 00 | M8 Z0 00 | 00 | 01 | 10 | 11 | |
| | | | | | | | | | | | | | page 0 (line 1) |
| 0 | M1 W0 01 | | | | | | | | | | | | addr 0 |
| 1 | M2 W0 01 | M1 X0 01 | M1 Y0 01 | M1 Z0 01 | M1 Z0 01 | M1 W0 01 | M1 X0 01 | M1 Y0 01 | 11 | 00 | 01 | 10 | addr 4 |
| 2 | M3 W0 01 | M2 X0 01 | M2 Y0 01 | M2 Z0 01 | M2 Z0 01 | M2 W0 01 | M2 X0 01 | M2 Y0 01 | 11 | 00 | 01 | 10 | addr 8 |
| 3 | M4 W0 01 | M3 X0 01 | M3 Y0 01 | M3 Z0 01 | M3 Z0 01 | M3 W0 01 | M3 X0 01 | M3 Y0 01 | 11 | 00 | 01 | 10 | addr 12 |
| 4 | M5 W0 01 | M4 X0 01 | M4 Y0 01 | M4 Z0 01 | M4 Z0 01 | M4 W0 01 | M4 X0 01 | M4 Y0 01 | 11 | 00 | 01 | 10 | addr 16 |
| 5 | M6 W0 01 | M5 X0 01 | M5 Y0 01 | M5 Z0 01 | M5 Z0 01 | M5 W0 01 | M5 X0 01 | M5 Y0 01 | 11 | 00 | 01 | 10 | addr 20 |
| 6 | M7 W0 01 | M6 X0 01 | M6 Y0 01 | M6 Z0 01 | M6 Z0 01 | M6 W0 01 | M6 X0 01 | M6 Y0 01 | 11 | 00 | 01 | 10 | addr 24 |
| 7 | M8 W0 01 | M7 X0 01 | M7 Y0 01 | M7 Z0 01 | M7 Z0 01 | M7 W0 01 | M7 X0 01 | M7 Y0 01 | 11 | 00 | 01 | 10 | addr 28 |
| 8 | | M8 X0 01 | M8 Y0 01 | M8 Z0 01 | M8 Z0 01 | M8 W0 01 | M8 X0 01 | M8 Y0 01 | 11 | 00 | 01 | 10 | |

ARCHITECTURE FOR A HIGH DEFINITION VIDEO FRAME MEMORY AND AN ACCOMPANYING DATA ORGANIZATION FOR USE THEREWITH AND EFFICIENT ACCESS THEREFROM

BACKGROUND OF THE DISCLOSURE

1. Field of the Invention

The invention relates to an architecture for a memory with a wide word width and particularly, though not exclusively, one suited for use as a high definition video frame store memory, and an accompanying organization for storing data, e.g., pixel values, in such a memory to facilitate efficient macroblock and raster access therefrom.

2. Description of the Prior Art

Digital systems that display video information generally incorporate a video frame store memory. This memory essentially allows a frame of video data to be independently received and written into the memory, and read from the memory for subsequent display. In addition, the memory also provides a vehicle through which desired pixel data, such as, e.g., a separate image, can be superimposed onto a stored image to yield a composite image for subsequent display.

Over the years, video images have been digitized with increasing resolution, thus generating a substantially increased amount of pixel data for a single video frame. As such, frame store memories have increased both in size and access speed; the former to store data for increased number of pixels in each image frame, the latter being required to transfer a correspondingly increasing amount of bits into and from the memory in order to assure that the video images are displayed in real-time.

Currently, high definition television (HDTV) and other high performance video display applications are being developed which operate at very high resolutions relative to prior video display applications. These applications generate enormous amounts of image data for a single frame and thus require inordinately high data transfer rates, such as a worst case scanning rate on the order of 800 Mbits/second for an HDTV image. As one would expect, such transfer rates, to assure real-time display, impose onerous bandwidth requirements both on the HDTV transmission channel as well as on the video frame store memory itself.

The art has attempted to ameliorate the bandwidth requirements, at least for transmission of an HDTV signal, through use of image compression. In that regard and to the extent relevant, a so-called MPEG-2 (Motion Picture Experts Group) standard has been adopted to provide a uniform method of image compression. In essence, this standard relies on transmitting video images on a layered hierarchical basis, for simplicity and in order of increasing granularity: a sequence made of groups of pictures (also referred to as "frames"); each group being formed of so-called "I", "P" or "B" pictures; each picture formed of so-called "slices", each "slice" formed of so-called "macroblocks"; each macroblock formed of four 8-by-8 blocks of luminance values and a single 8-by-8 pixel block for each of two chrominance values; with finally each pixel block being an 8-by-8 array of 8-bit (1 byte) sampled pixel values. At the highest level, sequences are independent segments in an MPEG data stream; each sequence has a header followed by one or more compressed pictures. Each picture may be an "I", "P" or "B" picture. An "I" ("intra") picture is one that is composed entirely of macroblocks with no reference to any other macroblocks, i.e. without any reference to any other picture. We will refer to these self-contained macroblocks as "I" macroblocks. A "P" ("predicted") picture is one that is predicted, using motion vectors, relative to a previous picture. In that regard, a "P" picture contains macroblocks which are described using macroblocks from previous "I" or "P" pictures as reference. Hence, a "P" picture is composed of "I" and "P" macroblocks. The position of a reference macroblock relative to a current macroblock is specified using motion vectors. In contrast, a "B" ("bi-directional") picture is one that is predicted, again through motion vectors, based on either a previous picture, a following picture, or both. Hence, a "B" picture may contain macroblocks which are described using macroblocks from previous or following (or both) "I" or "P" pictures as reference. We will refer to these macroblocks as "B" macroblocks. Thus, a "B" picture may contain "I", "P" and "B". macroblocks. A slice is formed of a sequence of macroblocks in raster scan order, i.e., horizontally across a vertical position in a picture. Each macroblock is a square portion of a picture, and sized as a 16-pixel by 16-line area. For each macroblock, three matrices are generated: a 16-by-16 matrix of 8-bit luminance, Y, component values, and a separate 8-by-8 matrix of 8-bit sub-sampled (2:1 both horizontally and vertically) pixel values for each of two chrominance components, U and V. Once these three component matrices are generated, they are each encoded in a similar fashion. Specifically, the values for each component for each macroblock are transformed through a discrete cosine transform (DCT), then quantized and finally encoded through variable run length coding to yield corresponding compressed data. For further details on MPEG compression, the reader is referred to, e.g.: *Information Technology—General Coding of Moving Pictures and Associated Audio*, Recommendation H.262 ISO/IEC 13818-2, Committee Draft, ISO/IEC JTC1/SC29 WG/602, International Organization for Standardization, November 1993, Seoul, pages 1–176. Decoding basically proceeds in an inverse fashion.

While use of the MPEG-2 compression standard is expected to appreciably reduce transmission channel bandwidth requirements, this standard has no effect on the video frame store memory within which, of necessity, pixel data must be totally decompressed for display. Hence, the problem of adequate video frame store memory bandwidth still persists.

A frame reconstruction circuit for use with an MPEG-2 decoder typically accesses a macroblock of pixel data at a time. Frame store memory transactions that would occur during a process of reconstruction depend on whether the macroblock is a "I", "P" or "B" type macroblock. In case of a "I" macroblock, all the information for its reconstruction is contained in the MPEG-2 bitstream. Hence, the frame reconstruction circuit accesses the frame store memory for writing a decoded macroblock. In the case of "P" macroblocks, the frame reconstruction circuit reads the reference macroblock from the frame store memory, re-constructs the current macroblock, and then writes the current macroblock to the frame store memory. Hence, one read and one write transactions are required. In the case of "B" macroblocks, the frame reconstruction circuit reads two reference macroblocks, re-constructs the current macroblock and then writes the current macroblock into the frame store memory. Hence, two read and one write transactions are required.

A macroblock which is reconstructed by the frame reconstruction circuit and written to the frame store memory always starts at a pixel whose horizontal and vertical positions, in a frame, are a multiple of 16. In contrast, a reference macroblock which is read by the frame reconstruction circuit can start at any arbitrary position on a grid which has twice the number of points in both horizontal and vertical directions compared to the original image. We will refer to this grid as the "half pixel" grid, as contrasted with a grid, i.e. a so called "full pixel" grid, that has the same resolution as the original image. This means that the frame reconstruction circuit actually needs to read an array of 17×17 pixels, starting at any arbitrary position on the full pixel grid. A 16×16 array on a half pixel grid can then be reconstructed using interpolation.

These requirements of the frame reconstruction process can be used to derive a data organization that is optimal for the frame reconstruction process. Consider a frame store memory which is n-bytes wide. Such a frame store memory stores n bytes in each location of the memory. For purposes of illustration, we will consider a 16-byte wide frame store memory and possible ways of storing luminance, Y, data. Each memory location can store 16 pixel values. The 16 pixels can be chosen from a number of possible pixel array organizations which include: 16×1, 1×16, 2×8, 8×2, and 4×4. The 4×4 organization is the most optimal for the frame reconstruction process and thus results in the fewest number of memory transactions.

While the frame reconstruction circuit requires macroblocks of data at a time, the scan circuitry, which obtains data for display from the frame store memory, has markedly different access requirements. The scan circuitry uses data on a raster basis which requires data representing a complete horizontal line at a time. Organizing data in the frame store memory to give optimal performance for the frame reconstruction process will result in non-optimal performance of scanning process. This is again illustrated using a 16-byte wide frame store memory. Since each memory location stores a 4×4 array of pixels, the scanning circuit would have to retrieve 4 lines of data to display a single line, hence wasting 75% of available memory bandwidth. As the width of the frame store memory increases, the scanning and frame reconstruction processes become increasingly incompatible.

Bandwidth requirements for HDTV frame store memory will require that the frame store memory be implemented as wide word memory if that memory is to be built using cost-effective technology. However, a conventional architecture, such as that described above, will result in less than optimal bandwidth.

Currently, video frame store memories are fabricated from large asynchronous dynamic random access memory (DRAM) integrated circuits. While these circuits provide a cost-effective memory implementation, an intrinsic operation of these memories tends to waste access time and diminish throughput. In particular, an asynchronous DRAM does not utilize a clock signal but instead requires that the accessing circuitry wait a specified amount of time until the memory completes its access operation and can provide accessed data at its output port. This forces any circuitry that is clocked faster than this memory access time to simply wait until that data is available. Synchronous DRAM (S-DRAM) circuits, e.g. 2 Mbyte×8 bit S-DRAM part number MT48LC2MSS1 S (hereinafter the "M8S1" part) from Micron Semiconductor, Inc. in Boise, Id., will shortly become available. S-DRAMs are clocked; a finite number of clock cycles is required for a random access operation. S-DRAMs, specifically the M8S1 part, will provide an operational mode known as the "burst" mode through which 1, 2, 4 or 8 contiguous memory locations may be sequentially accessed and advantageously only the first memory access involves a fixed amount of wait with subsequent accesses occurring without any waiting. S-DRAMs also will have a dual memory bank architecture. If the data organization within S-DRAMs is such that a burst mode access, which is equal to or greater in duration than the random access time, can be utilized, then it should conceivably be possible to interleave data in the two memory banks and obtain full utilization (100%) of available memory bandwidth. In principle, this is possible because the waiting to complete a random access operation for each bank can occur while the other bank is being accessed in its "burst" mode. While a potential appears to exist for very high bandwidth utilization through use of S-DRAMs, in practice, conventional data organizations that would employ S-DRAMs may not be able to provide this result for the simple reason that not every burst mode access will be fully utilized due to conflicting memory access requirements; hence, once again wasting memory access and bandwidth.

Thus, a need exists in the art for a large video frame store memory, particularly one with a wide word width, that does not exhibit appreciable access inefficiencies due to conflicting access requirements of, e.g., a macroblock-based frame reconstruction circuit and a raster-based scan circuit. Furthermore, such a memory should be amenable to implementation with S-DRAM circuits. Advantageously, such a video frame store memory should exhibit markedly increased bandwidth over conventional video frame store memories and thus be capable of operating at very high data transfer rates expected in HDTV and other high performance video applications.

SUMMARY OF THE INVENTION

Our invention advantageously and substantially eliminates the deficiencies associated with conventional video frame store memories.

In accordance with our inventive teachings, our inventive memory utilizes an n-byte wide frame store memory of sufficient depth, i.e. d words. Each n-byte wide word represents an $m_1 \times m_2$ array of pixels where $m_1 \times m_2$ equals n. The frame store memory is actually composed of $m_2$ independent physical segments, each being $m_1$ bytes wide and having depth d words. We will refer to theses segments using indexes 0 through $(m_2-1)$. Preferably, $m_2$ should be a power of 2, i.e., $m_2=2^p$ where p is a positive integer. This allows the $m_2$ independent memory segments to share a common address bus, except for the p least significant bits of that bus which will be independent for each of the $m_2$ memory segments. We will refer to this $m_1 \times m_2$ array of pixels as a "sub-block". A sub-block is composed of $m_1$ columns and $m_2$ rows. We will call each row of $m_1$ pixels within a sub-block a "nibble". Within each sub-block, nibble 0 denotes a topmost nibble and nibble $m_2-1$ denotes a bottommost nibble. The $m_2$ nibbles from each sub-block are distributed into the $m_2$ memory segments. Further, the sub-blocks are indexed in a modulo $m_2$ fashion, starting at a beginning of each sub-block row. The sub-block indexes start at 0 and increment up to $m_2-1$ and then start at 0 again. The following expression describes the manner through which nibbles are stored into the memory segments:

For sub-block (i), $(0 \leq i < (m_2-1))$
nibble$_j \rightarrow$ segment$_{(j+i)}$ $(0 \leq j < (m_2-1))$
where: (j+i) represents a modulo $m_2$ addition, and i and j are integer indices.

Our inventive data organization together with independent addressing of memory segments provides an ability to simultaneously access either $m_2$ nibbles of a sub-block or $m_2$ contiguous nibbles on a horizontal line. Accessing a sub-block is useful for frame reconstruction operations, while accessing contiguous nibbles on a horizontal line is useful in scanning operations. This data organization requires that the ordering of nibbles be changed before writing to memory, and again after reading from the memory. This re-ordering can be easily and advantageously achieved, through, e.g., a parallel data shuffler (barrel shifter), without sacrificing memory throughput.

Specifically, a preferred embodiment of our inventive frame store memory may be constructed where n=16, $m_1$=4, $m_2$=4 and p=2. This specific implementation yield a square, 4×4 sub-block. Furthermore, this implementation allows use of dual bank S-DRAMs to their full potential. This particular frame store memory can be operated in a burst mode where each burst contains four sequential accesses, and data is interleaved after every four accesses. Such a memory has the advantage that it can be operated at up to a 100 Mhz clock rate at full efficiency.

Through our inventive technique, a video frame store memory can be accessed through either of two widely differing forms of access, e.g. macroblock and raster scan, each at a very high efficiency and hence at essentially full memory bandwidth—which is significantly greater than the memory bandwidth obtainable through conventional video frame store memories. As a result, the individual S-DRAM memory circuits that could be used to implement our inventive frame store memory, particularly though not exclusively, our preferred embodiment, as contrasted with those needed to implement a conventional video frame store memory, can be clocked at a lessened rate, if desired, thereby advantageously permitting less expensive S-DRAM memory circuits to be used than would otherwise be required.

BRIEF DESCRIPTION OF THE DRAWINGS

The teachings of the present invention can be readily understood by considering the following detailed description in conjunction with the accompanying drawings, in which:

FIG. 2A depicts four illustrative adjacent image sub-blocks 210 in a HDTV image portion 200 as those segments would be displayed on video display 95 within receiver 5 shown in FIG. 1;

FIG. 2B depicts the manner, in accordance with our invention, that four sub-blocks, corresponding to image sub-blocks 210 shown in FIG. 2A, would be stored within video frame store memory 80 within receiver 5 shown in FIG. 1;

FIG. 3A depicts individual addresses that would be simultaneously applied during a single memory read operation to the four segments of memory 80 to yield a horizontal scan line (e.g., scan line $205_o$) within image segment 200 shown in FIG. 2A, and the corresponding pixel data that would result from each segment;

FIG. 3B depicts individual addresses that would be simultaneously applied during a single memory read operation to the four segments of memory 80 to yield a sub-block (e.g., sub-block $210_w$) within image segment 200 shown in FIG. 2A, and the corresponding pixel data that would result from each memory segment;

FIG. 4 depicts a block diagram of memory 80 shown in FIG. 1;

FIG. 5A depicts, in a simplified fashion, data flow that would occur during scanning (for subsequent display) and involving memory 430, shown in FIG. 4;

FIG. 5B depicts, in a simplified fashion, data flow that would occur during frame reconstruction and involving memory 430, shown in FIG. 4;

FIG. 6 depicts a diagram of data shuffler 410 shown in FIG. 4;

FIGS. 8 and 9 depict the manner through which pixel data for halves 720 and 730, respectively, of two image macroblocks 710, shown in FIG. 7, would be stored in accordance with our inventive teachings within two banks of video frame store memory 80 shown in FIG. 1;

FIG. 10 depicts, in tabular form, corresponding data resulting from sequential write operations for collectively writing image macroblocks 710 into video frame store memory 80 shown in FIG. 1, and specifically for the interlaced image data shown in FIG. 7;

FIG. 11 depicts, in tabular form, corresponding data resulting from sequential read operations for collectively reading image macroblock 710 from video frame store memory 80 shown in FIG. 1, and specifically for the interlaced image data shown in FIG. 7; and FIG. 12 depicts, in tabular form, corresponding data resulting from sequentially reading video frame store memory 80 in order to access image macroblocks 710 therefrom in a raster scan fashion and specifically for the interlaced image data shown in FIG. 7.

To facilitate understanding, identical reference numerals have been used, where possible and not stated to the contrary, to designate identical elements that are common to the figures.

DETAILED DESCRIPTION

After considering the following description, those skilled in the art will clearly realize that the teachings of our inventive memory architecture and accompanying data organization can be readily utilized in nearly any high performance video or other application where relatively wide word length memories are to be used with two widely varying forms of access (e.g., block and lineal) thereto. By significantly reducing unnecessary memory access operations particularly where only a portion and not a complete block of pixel data is required, memory bandwidth significantly and advantageously increases. Since our invention finds particular, though not exclusive, use in the context of a video frame store memory within an HDTV (high definition television) receiver, then, for the sake of brevity and simplicity, we will discuss our invention in that particular context and illustratively with a 16-byte wide video frame store memory.

Figure 1:
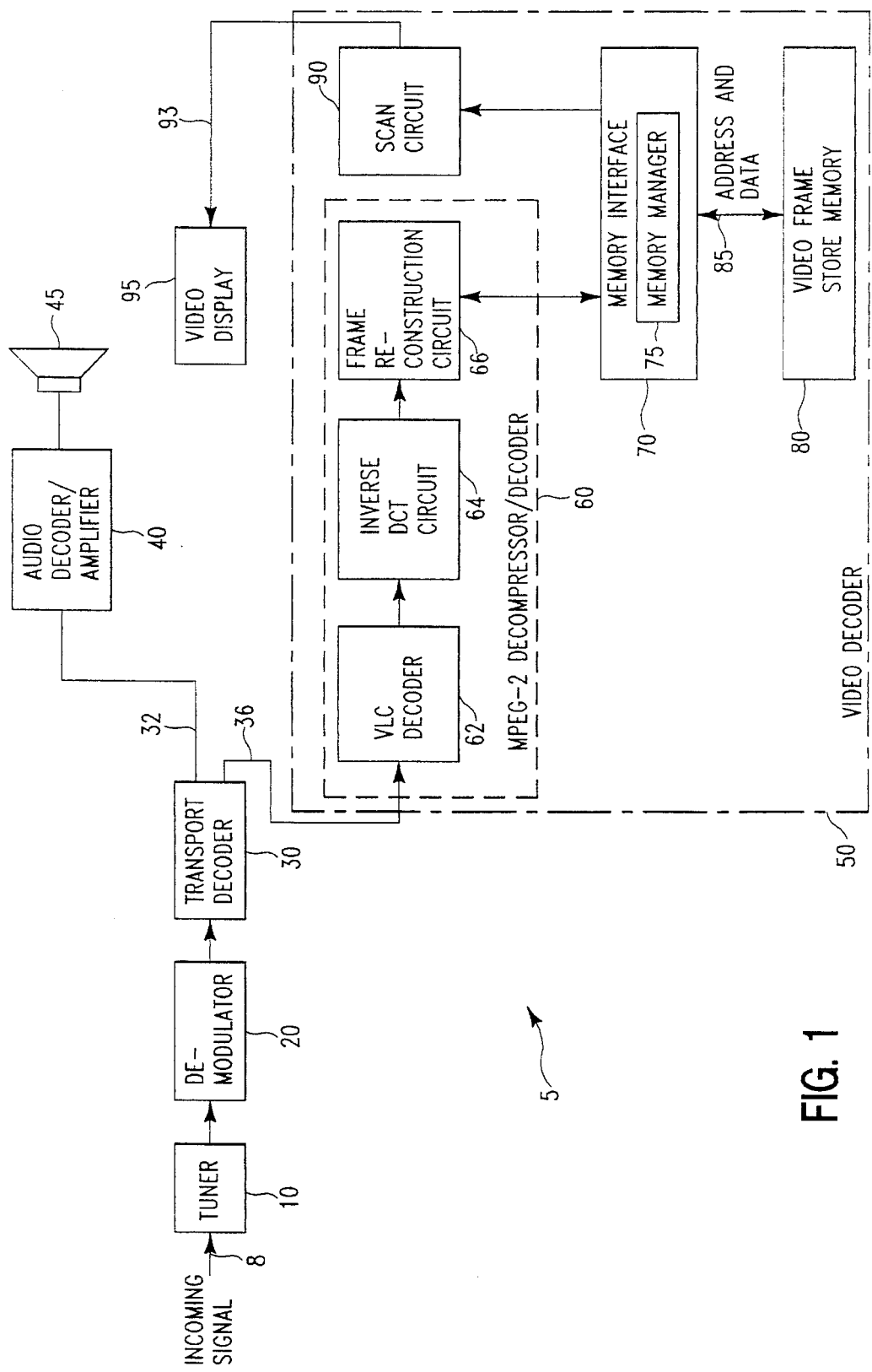
FIG. 1 depicts a simplified high-level block diagram of a typical high definition television (HDTV) receiver 5 that contains video frame store memory 80 which embodies the teachings of our invention.

FIG. 1 depicts a simplified high-level block diagram of a typical HDTV receiver 5 that contains a video frame store memory which embodies the teachings of our present invention. Generally speaking, this receiver contains tuner 10, de-modulator 20, transport decoder 30, audio decoder/amplifier 40, speaker 45, video decoder 50 and video display 95.

In essence, incoming signals, whether from a cable feed or a direct antenna connection, are applied, via lead 8, to tuner 10. The tuner extracts an HDTV signal for a desired HDTV channel from the incoming signals and supplies a corresponding baseband modulated signal for that channel to demodulator 20. Given the modulation scheme being used, e.g., quadrature amplitude modulation (QAM) or vestigial sideband, the de-modulator appropriately extracts the digitized HDTV information from the baseband signal and supplies that information to transport decoder 30. This decoder separates coded audio and video components from the signal and applies the coded audio component, via lead 32, to audio decoder/amplifier 40 and the coded video component, via lead 36, to video decoder 50. The audio decoder/amplifier decodes the coded audio information, converts the resulting decoded information to an analog audio signal, and appropriately amplifies the analog audio signal to a power level sufficient to drive speaker 45. The amplified signal is then applied to speaker 45 to reproduce the sound components carried within the desired HDTV signal.

Video decoder 50 contains MPEG-2 decompression/decoder 60, memory interface 70, video frame store memory 80 and scan circuit 90. As noted above, the MPEG-2 standard considers each frame as being formed of 16-pixel by 16-line macroblocks. Since color information is being transmitted, each such macroblock is represented by three matrices of data: a 16-by-16 matrix for luminance, Y, data, and a separate corresponding 8-by-8 sub-sampled matrix for each chrominance component, U and V. The decoding operations, as well as frame reconstruction, and storage and access within video frame store memory 80, are separately and essentially identically performed for the luminance and both chrominance components. Consequently, for purposes of brevity, the following discussion will only specifically address the luminance component.

So-called "I" (intra) pictures are frames that are coded with no reference to either a preceding or succeeding frame in an MPEG-2 picture group. As such, each such frame is completely self-contained and thus independently coded and compressed; hence fully defining its own video content.

Accordingly, the video signal for any such "I" frame, appearing on lead 36, is independently decoded by MPEG-2 decompressor/decoder 60. To do so, an incoming coded video signal for this frame is first routed to VLC (variable run length code) decoder 62 within decompressor/decoder 60. Decoder 62 essentially decompresses the variable run length encoding of this signal. The resulting decoded signal, which is formed of quantized discrete cosine transform (DCT) coefficients of a video signal, transformed on a block basis, is then inverse quantized within decoder 62 and applied to inverse DCT circuit 64. This circuit inverts the discrete cosine transform for each transformed 8×8 block to recover the digitized video information itself in this 8×8 block and subsequently a macroblock. The resulting macroblock is then positioned at its proper location within a frame by frame reconstruction circuit 66 which, through memory interface 70, stores the resulting macroblock within a frame buffer in video frame store memory 80.

Scan circuit 90 obtains, through memory interface 70, stored pixel data on a raster-scan basis, i.e., pixel data for a complete scan line at a time, from video frame store memory 80. Circuit 90 converts this data into an appropriate video signal and applies that signal, via lead 93, to video display 95 for subsequent display thereat. This circuit also interpolates the sub-sampled U and V data and displays resulting interpolated data accordingly.

As noted, pixel data is written into and read from video frame store memory 80 via leads 85 and memory interface 70. The interface is connected to both frame reconstruction circuit 66 and scan circuit 90. This interface, apart from providing well-known electrical interconnections and appropriate buffering and control 25 functions, contains conventional memory manager 75. Memory 80 serves two independently functioning circuits; namely, frame reconstruction circuit 66 on a macroblock-by-macroblock read/write basis, and scan circuit 90, on a raster-scan read basis. For any given instance in time, this manager specifies which one of the two circuits will gain access to and be served by video frame store memory 80.

Hence, as one can appreciate, based on the type of image being received, specifically "P" or "B" frame, frame reconstruction circuit 66 accesses, through memory interface 70, appropriate portions of a preceding or succeeding image on a macroblock-by-macroblock basis in order to properly construct successive video frames and accurately depict real-time motion therein.

Thus, video frame store memory 80 is faced with two markedly conflicting forms of access; namely, macroblock-by-macroblock basis for frame reconstruction circuit 66 and raster-scan basis for scan circuit 90. Inasmuch as video frame store memory 80, as is conventionally taught, and associated memory manager 75 are both configured for macroblock at a time type access, memory bandwidth markedly decreases, due to wasted access operations, whenever a raster of image data is accessed.

In accordance with the teachings of our present invention, our inventive technique for storing data within memory 80 sharply reduces the number of memory accesses that would result in the process of reading data from frame store memory 80 on a raster scan basis, and thus significantly and advantageously increases the bandwidth of the memory.

Conventionally speaking, each stored macroblock in a video frame store memory is organized to hold a square portion of a frame, typically 16-pixels by 16 image scan lines, in a top-down fashion of occurrence, with each pixel requiring a byte of data for luminance information. For purposes of easy understanding, an image macroblock is defined as a displayed version of a stored macroblock; the latter being the corresponding macroblock of pixel data stored within a video frame store memory. With conventional stored macroblocks, the first, or uppermost, 16-byte scan line in an image macroblock is stored as the uppermost row in the stored macroblock. The second, i.e., next successive, scan line in the image macroblock, which is to be displayed directly below the first scan line in the image macroblock, is stored in the next lower, i.e., second, row in the stored macroblock, and so forth for the third and fourth scan lines and on. Each stored macroblock in the image has the exact same top-down ordering, from its uppermost image line to its lowermost image line as its corresponding image macroblock.

In sharp contrast to this conventional pattern of storing macroblocks of pixel data and accessing them as such, our invention uses the following memory and data organization. We begin by using n-byte wide frame store memory of sufficient depth, i.e. d words. Each n-byte wide word represents an ($m_1 \times m_2$) array of pixels where $m_1 \times m_2$ equals n. The frame shore memory is actually composed of $m_2$ independent physical segments, each being $m_1$ bytes wide and of depth d words. We will refer to these segments using indexes 0 through ($m_2-1$). Preferably, $m_2$ should be a power of 2, i.e., $m_2=2^p$ where p is an integer. This allows the $m_2$ independent memory segments to share a common address bus except for the p least significant bits of that bus which will be independent for each of the $m_2$ memory segments. We will refer to this $m_1 \times m_2$ array of pixels as a "sub-block". A sub-block is composed of $m_1$ columns and $m_2$ rows. We will call each row $m_1$ pixel row within a sub-block a "nibble", and, within each sub-block, nibble 0 denotes a topmost nibble and nibble $m_2-1$ denotes a bottom nibble. The $m_2$ nibbles from each sub-block are distributed across the $m_2$ memory segments. Further, sub-blocks are indexed in a modulo $m_2$ fashion, starting at a beginning of each sub-block row. The sub-block indexes start at 0 and increment up to $m_2-1$ and then start with 0 again. The following expression describes a manner through which nibbles are stored into the memory segments:

For sub-block (i), $(0 \leq i < (m_2-1))$
  nibble$_j \rightarrow$ segment$_{(j+i)}$ $(0 \leq j < (m_2-1))$
  where: (j+i) represents a modulo $m_2$ addition, and i and j are integer indices.

This inventive data organization together with independent addressing of memory segments permits simultaneous accessing of either $m_2$ nibbles of a sub-block or $m_2$ contiguous nibbles on a horizontal line. Accessing of a sub-block is useful for frame reconstruction operations, while accessing of contiguous nibbles on a horizontal line is useful in scanning operations. This data organization requires that the ordering of nibbles to be changed before writing to memory, and again after reading from the memory. This re-ordering can be easily achieved, as discussed in detail below, without sacrificing memory throughput. We will refer to this data reordering process as "data shuffling".

Specifically, our preferred frame store memory embodiment may be constructed where n=16, $m_1$=4, $m_2$=4, and p=2. This specific implementation has a square, 4×4, sub-block. This specific implementation also allows use of dual bank S-DRAMs to their full potential. This frame store memory can be operated in a burst mode where each burst contains four sequential accesses, and data is interleaved after every four accesses.

With the above in mind, FIG. 2A depicts four illustrative adjacent image sub-blocks 210 in a HDTV image macroblock portion 200, as those sub-blocks would be displayed on video display 95 within receiver 5 shown in FIG. 1. As shown in FIG. 2A, sub-blocks 210 are formed of a single horizontal series of four 4-by-4 byte sub-blocks $210_W$, $210_X$, $210_Y$ and $210_Z$, also labeled W, X, Y and Z, respectively. Each of these sub-blocks holds a portion of four common lines $205_0$, $205_1$, $205_2$ and $205_3$ (also denoted as lines 0, 1, 2, and 3, respectively) of pixel data in an image macroblock. For ease of reference, each row (line), which we also refer to as a "nibble", such as nibble 203, in each sub-block carries a different shading, with the same shading indicating a common line across all four sub-blocks.

As shown in FIG. 2B, square image sub-blocks 210 depicted in FIG. 2A are here each transposed into four successive 16-by-1 byte rows 220 of pixel data and stored in video frame store memory 80 (see FIG. 1) but with a 4-byte horizontal offset between successive rows. The video frame store contains four independently addressable memory segments, here labeled as A, B, C and D in FIG. 2B. Arrows $215_W$, $215_X$, $215_Y$ and $215_Z$ which, in FIG. 2A, show the order of occurrence of the rows (nibbles) of pixel data in each image sub-block have now effectively been transposed, as shown in FIG. 2B, from a vertical to a horizontal direction as shown by corresponding arrows $230_W$, $230_X$, $230_Y$, and $230_Z$. Each successive stored row (nibble) of sub-block data is shifted by four pixel positions to the right with respect to the prior row. As such, a raster of image data arranged horizontally across the image is stored diagonally across the four memories. In that regard, note 16-byte image line portion 0-W, 0-X, 0-Y and 0-Z, which is situated horizontally in image portion 200 but is oriented diagonally, as shown in FIG. 2B, across the video frame store memory.

Inasmuch as all four memories are accessed in parallel, an entire 16-byte sub-blocks can now be accessed in the time required for one memory access, rather than four accesses as would occur in conventional video frame store memories. Furthermore, through parallel accesses, each access for a 16-byte raster occurs in essentially the same time as a sub block access, though with an allowance for a one clock cycle delay to properly "shuffle" the resulting 4-byte data emanating from the memories.

As all four memory segments, here denoted as segments A, B, C and D, can be independently addressed for memory locations that are controlled by two least significant bits of the address bus, it is possible to read either a sub-block, e.g. nibbles 0-W, 1-W, 2-W, 3-W, or a portion of a horizontal line, e.g. nibbles 0-W, 0-X, 0-Y and 0-Z in one memory access. A shuffling operation will be required to reorder the data correctly after the memory access. Since this shuffling can be "pipelined" with memory access operations, as illustrated and described below, shuffling will advantageously and not appreciably, if at all, reduce the throughput of the system.

For the illustrative example shown in FIGS. 2A and 2B, the two least significant bits of individual addresses that would be applied to the four memory segments for reading a horizontal scan line and a sub-block, respectively, are shown in FIGS. 3A and 3B, specifically tables 300 and 350. These tables also show the resulting pixel data that would be produced from each memory segment.

FIG. 4 depicts a block diagram of memory 80. As shown, this memory is formed of data shuffler (barrel shifter) 410 connected to data lines (data inputs/outputs) of memory 430; the latter being formed of four banks of equal-sized independently addressable 32-bit wide memory segments $430_A$, $430_B$, $430_C$ and $430_D$—with memory segment A being the least significant and segment D being the most significant. Illustratively, these memory segments can be fabricated from 2 Mbit×16 S-DRAM circuits, such as part number MT48LC2M8S1 S (the "M8S1" part) from Micron Semiconductor, Inc. in Boise, Id. The size of these S-DRAM circuits is not critical and other S-DRAM circuits, other than the M8S1 part, can just as easily be used instead. For HDTV applications, memory 80 preferably has a capacity of 16 Mbytes. Twelve-bit addresses (A11:0) are applied through address lines 450 to address (addr) inputs to all of the memory segments, with the high-order ten bits of this address (A11:2) being applied in parallel to each of the memory segments. These ten bits collectively specify a particular row of sub-blocks in a macroblock that has been stored across the four memory segments. As noted, successive rows (nibbles) of a sub-block stored across various segments can be offset by as much as three memory locations (a total of 12 bytes) from one segment to the next. Hence, the least significant two bits of the address for each segment (addresses AA1:0; AB1:0; AC1:0; AD1:0) point to the exact location, in that particular segment, for the row (nibble) being accessed therefrom for this sub-block. These two least significant address bits are either the same across all four segments for a sub-block access or vary among the segments for a raster scan line access.

Leads 420 carry read/write data between data shuffler 410 and all the segments (A–D) of memory 430. All data that is read from or written into the memory segments passes through the data shuffler and re-ordered therein, if necessary.

For 16-byte sub-block access, 16-bytes of read data (D127:0) are provided in parallel by the memory banks, with each segment providing four of those bytes. Since rows of a sub-block are each stored across the same addressed location in each of the four memory segments, then an identical twelve-bit address is applied to each of the memory segments to access the sub-block in parallel. The resulting output bytes are routed in parallel, via data leads 425 to leads 420 and from there, via data shuffler 410 and memory interface 70, directly to frame reconstruction circuit 66. To access raster scan data, 16 bytes of data are again accessed in parallel, but in order to access, across a diagonal (as noted above), the correct four-byte portions of a common image line, different low-order two address bits are applied, in parallel, to each of the four memory banks. The resulting 16-bytes then are also applied, through leads 425 and 420, to an input of data shuffler 410. This shuffler is a barrel shifter which operates on 4-byte groups of data within a 16-byte word. Here, this shuffler properly re-arranges the 4-byte groups of the 16-byte output data in order to yield a raster in which the four-byte groups are arranged in their correct order of occurrence for display. The proper order is specified through control signals appearing on leads 415 (from memory manager 75 shown in FIG. 1). The output of the data shuffler is applied through leads 405 to scan circuit 90, via memory interface 70.

FIG. 5A depicts, in a simplified fashion, data flow, involving memory 430 shown in FIG. 4, that would occur during scanning (for subsequent image display). As depicted in FIG. 5, data is read from memory 430 and applied through data shuffler 410 to scan circuit 90, and eventually to video display 95. For ease of understanding, memory interface 70 has been omitted from this figure, as well as from FIG. 5B. Data flow with respect to frame reconstruction occurs, as shown in simplified fashion in FIG. 5B, bi-directionally between memory 430 and data shuffler 410, and bi-directionally between frame reconstruction circuit 66 and the data shuffler, the frame reconstruction circuit also receiving input pixel data from inverse DCT circuit 66.

FIG. 6 depicts a diagram of data shuffler 410, shown in FIG. 4. As described above, the data shuffler is a barrel shifter which operates on 4-byte groups of data within a 16-byte word. All data that is read from or written into memory 430 passes through the data shuffler, which, as necessary, re-arranges 4-byte groups of 16-byte data written into or read from the memory banks into their correct order of occurrence. As depicted in FIG. 6, the data shuffler is formed of two identical barrel shifters 620 and 650, each of which re-arranges 4-byte groups within an incoming 16-byte data word. Shifter 620 operates on data read from memory 430 (i.e. on each memory read word propagating in the direction shown by arrow 684) and appearing on leads 420 for application to memory interface 70; shifter 650 operates in the reverse direction for write data, i.e. data to be written into memory 430, specifically each memory write word propagating in the direction shown by arrow 684. Inasmuch as both shifters are identically constituted and operate in an identical fashion, we will only describe shifter 620 in detail.

Shifter 620 contains four multiplexors 610, specifically multiplexors $610_0$, $610_1$, $610_2$ and $610_3$, and four tri-state buffers 630, specifically buffers $630_0$, $630_1$, $630_2$ and $630_3$; with the output of each of the multiplexors feeding an input of a corresponding one of the buffers. Each multiplexor has four 4-byte inputs; namely, $I_a$, $I_b$, $I_c$ and $I_d$, connected through leads 605 to leads 420 from memory 430. The four 4-byte groups of data within the 16-byte data appearing on leads 420 can take any one of only four permutations. Accordingly, the same four inputs to all the multiplexors are hard-wired to a corresponding permutation of the 4-byte groups on leads 420. For example, input $I_a$ of multiplexors $610_0$, $610_1$, $610_2$ and $610_3$ is wired to the first, second, third and fourth 4-byte groups, respectively, on leads 420. Input $I_b$ of multiplexors $610_0$, $610_1$, $610_2$ and $610_3$ is wired to the second, third, fourth and first 4-byte groups, respectively, and so forth for the other two inputs, $I_c$ and $I_d$. A two-bit READ SELECT signal is applied on leads 615 to all four multiplexors, with each value of the select signal causing each multiplexor to select a corresponding one of the four 4-byte groups then appearing on leads 420 and to route its selected group to an input of a corresponding buffer amplifier. Upon application of a high level READ ENABLE signal to all the multiplexors, via lead 635, the buffers apply all four selected 4-byte groups, in parallel, via leads 640, specifically leads $640_0$, $640_1$, $640_2$ and $640_3$, as "shuffled" output data to leads 405 and from there to memory interface 70. By virtue of the action of multiplexors 610, the 16-byte data word appearing on leads 420 is re-ordered ("shuffled"), by 4-byte groups, into a correctly ordered data word appearing on leads 405. In order to store pixel data but with the proper positional offsets in the memory banks, shifter 650 provides similar 4-byte ordering of a 16-byte data word appearing on leads 405 and 645, and routes its resulting "shuffled" output word, via leads 680 and 420, to memory 430.

Figure 7:
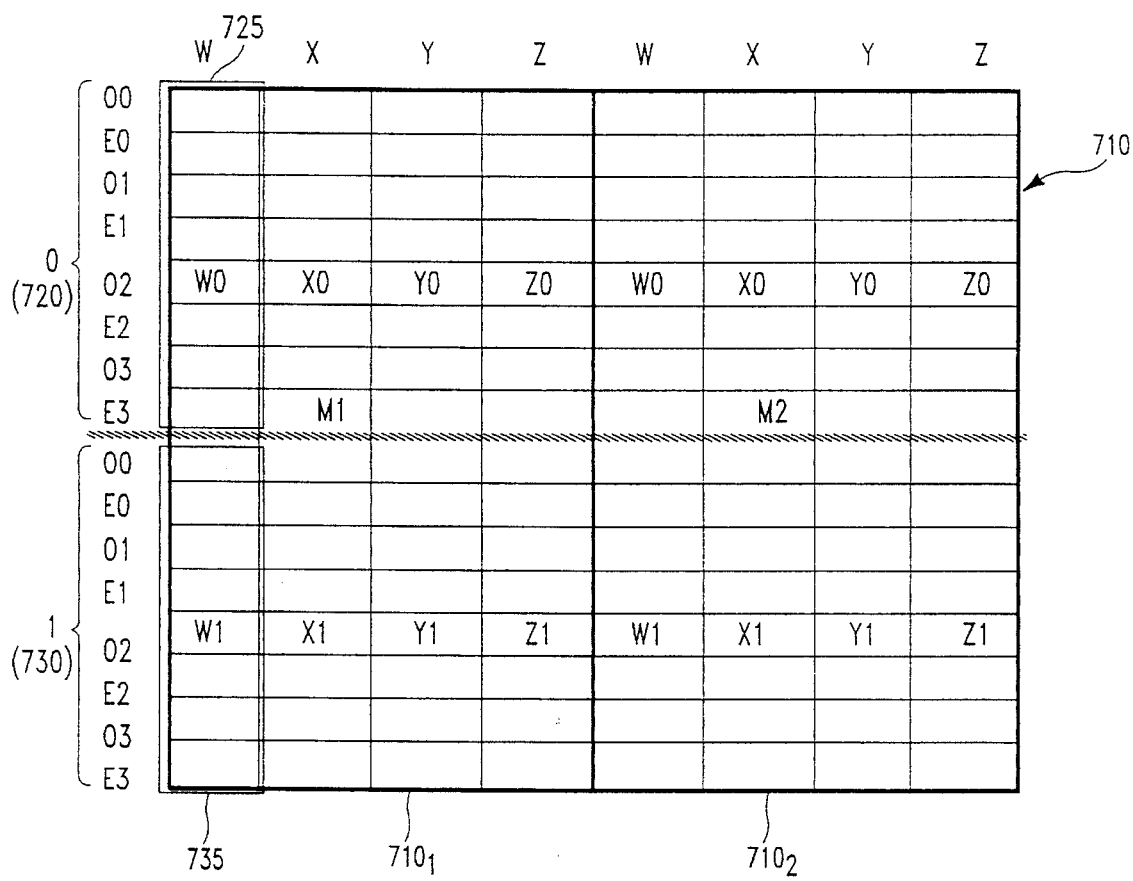
FIG. 7 depicts two illustrative adjacent macroblocks 710 of interlaced luminance data in an HDTV image.

Our invention is applicable not only to non-interlaced video data, as has been shown and discussed thusfar, but also advantageously to interlaced video data. In that regard, FIG. 7 depicts two illustrative adjacent macroblocks 710, specifically macroblocks $710_1$ and $710_2$, of interlaced luminance data in an HDTV image. As shown and in accordance with our invention, each macroblock is divided into four sub-blocks W, X, Y and Z; each being 4 pixels (4-bytes) wide. Since these macroblocks contain interlaced data, each of these sub-blocks is further divided into two halves, represented by 0 and 1, specifically halves 720 and 730, respectively. Each of these halves has eight pixel lines; with four of these lines belonging to an odd field, specifically lines 00, 01, 02 and 03, and the other four lines belonging to an even field, specifically E0, E1, E2 and E3. An individual sub-block is represented by illustratively sub-block 725, also denoted as W0, in half 720 and sub-block 735, also denoted as W1, in half 730.

As depicted in tables 800 and 900 in FIGS. 8 and 9, respectively, the odd and even field portions of both halves of the image macroblocks are written into different odd and even buffer pages within video frame store memory 80 (see FIG. 1), with appropriate 4-byte positional offsets as taught by our invention. Halves 720 and 730 of image macroblocks 710 are written into banks 0 and 1, respectively, of memory 80. As to bank 0, the four odd lines (00, 01, 02, 03) in image sub-block W0 (725), for half 720 of macroblock M1 ($710_1$) shown in FIG. 7, i.e., lines [M1 W0 00, M1 W0 01, M1 W0 02, M1 W0 03], are written into location 0 (Loc. 0), shown in FIG. 8, across memory segments A, B, C and D, in an odd buffer page (Odd Buffer Page 0, Bank 0) as [00, 01, 02, 03] in this bank. The four odd lines in the next image sub-block X0 are then written, with a 4-byte positional offset, into the next location (Loc. 1) in this odd buffer page as [03, 00, 01, 02]. The four odd lines for each of the following two image sub-blocks, Y0 and Z0, are then written, again with appropriate positional offsets, across a corresponding one of the next two locations (Loc. 2 and Loc. 3) in this odd buffer page. Similarly, pixel data for even lines (E0, E1, E2, E3) for these image sub-blocks W0, X0, Y0 and Z0 in half 720 of this same image macroblock are written, also with appropriate positional offsets, into consecutive locations in an even buffer page (Even Buffer Page 0, Bank 0). In a similar fashion, the odd and even lines of pixel data for half 730 of macroblock M2 (also denoted as $710_2$) are written, with appropriate positional offsets, into corresponding locations 4–7 of the odd and even buffer pages, and across memory segments A, B, C and D in bank 0. Pixel data for image sub-blocks in the lower half, i.e., halves 730, of macroblocks $710_1$ and $710_2$ is stored, as depicted in FIG. 9, across separate lines in odd and even buffer pages within another bank, here bank 1.

Given the organization for storing interlaced pixel data as defined in tables 800 and 900 within video frame store memory 80, FIGS. 10 and 11 depict through tables 1000 and 1100, respectively, corresponding data resulting from sequential operations for collectively writing and reading image macroblocks 710 into and from this memory. Each row of these two tables, as well as of table 1200 shown in FIG. 12 and discussed below, corresponds to the state of various signals at each clock cycle, with "t" representing time in clock cycles. Also, in FIGS. 10–12, each non-interlaced macroblock is demarcated by a darkened horizontal line.

Table 1000 depicted in FIG. 10 lists the data output of the frame reconstruction circuit and hence data shuffler input, the output of the data shuffler and input to the memory banks, along with the corresponding memory addresses. In an S-DRAM implementation, the first of four addresses (AA, AB, AC, AD) in accessing any macroblock, for write or read operations, can be supplied externally, and is held constant throughout access of that entire macroblock. The subsequent three incremented values of this address, which are needed to access subsequent sub-blocks within this macroblock, can be generated internally within the S-DRAM memories. As indicated, a single clock cycle is consumed in appropriately "shuffling" the data through the data shuffler prior to applying the resulting "shuffled" data to the memory banks; thereby causing the output of the data shuffler to lead a corresponding memory access operation by one clock cycle. Inasmuch as data shuffling is pipelined with memory write operations, no loss in memory throughput results therefrom.

As to Table 1100 shown in FIG. 11, this table lists the output data produced by the memory banks and hence the input to the data shuffler, the output of the data shuffler and hence the input to the frame reconstruction circuit, as well as the corresponding memory addresses. Here too, the operations of the memory and data shuffler are shown staggered by one clock cycle, with the access of the memory leading the output of the data shuffler by one clock cycle. Hence, since data shuffling is pipelined with memory read operations again no loss in memory throughput arises from the use of this shuffling.

FIG. 12 depicts, through table 1200, corresponding data resulting from sequentially reading memory 80 in order to access image macroblocks 710 therefrom in a raster scan fashion. This table lists the output from the memory banks and the data shuffler input, and the output from the data shuffler and the input to the scan circuit, along with the corresponding memory addresses. As shown in this table, the memory banks A, B, C and D are independently addressed which permits simultaneous reading of a 16-by-1 block of pixels. Scanning a line involves incrementing a column address by four during each cycle. This table illustratively shows eight pixels from line 0 (originally shown in FIGS. 7–9) being scanned and eight pixels from line 1 being scanned.

Although we have described our invention for use in an HDTV receiver, particularly a video decoder section thereof, our invention can be used in any high performance video application, such as a high speed, e.g., real-time, computer display or a multi-media computer that incorporates a video display. Though the benefits of using our invention become increasingly apparent and advantageous as video frame store memories are implemented with increasingly wide data words, our invention can be used with nearly any video frame store memory, whether it uses a wide word width or not. Furthermore, although we have described our invention for purposes of illustration with a particular data word width, e.g., 16-bytes (128 bits), and sub-block size, e.g., 4-by-4 byte, other word widths can be used with a concomitant change, if necessary, in the sub-block size and number and word width of the memory segments that will be employed within the video frame store memory. Anyone skilled in the art will readily appreciate all the necessary changes that would need to be made to the preferred embodiment in order to conform it to a particular implementation.

Hence, by now those skilled in the art clearly realize that although we have shown and discussed our invention in terms of a single preferred embodiment, many other embodiments can be readily developed that incorporate our inventive teachings.

We claim:

1. Apparatus for a frame store memory comprising:

a memory circuit for storing n-byte wide words and having $m_2$ independent segments, each segment storing $m_1$-byte wide nibbles, wherein each of said n-byte words contains pixel data for a corresponding one of a plurality of ($m_1$-by-$m_2$) arrays of pixels, each of said arrays representing a corresponding one of a plurality of sub-blocks of pixel data for an image, the memory circuit containing each of the $m_2$ nibbles, in a common corresponding one of the sub-blocks, distributed across the $m_2$ memory segments with a predefined positional offset between successive ones of the $m_2$ nibbles stored in successive ones of the segments, and wherein each of the memory segments is accessed, on either a read or write basis and with a corresponding memory address, to respectively read a nibble from each of the segments so as to collectively form an n-byte memory read word or to write a nibble into each of said memory segments from collectively an n-byte memory write word (where n, $m_1$ and $m_2$ are all pre-defined integers with n=($m_1 \times m_2$)); and a data shuffling circuit, connected to the memory segments, for rearranging, in a corresponding pre-defined nibble-wise fashion, for a memory write operation an n-byte input word into the memory write word and, for a memory read operation, the memory read word into a properly ordered n-byte output word, wherein said output word contains pixel data for either one of said sub-blocks or a scan line in the image.

2. The apparatus in claim 1 wherein the pre-determined positional offset is a modulo-2 positional offset.

3. The apparatus in claim 2 wherein distribution of the nibbles across the $m_2$ memory segments occurs in accordance with the following equation:

for sub-block$_i$: $0<i<(m_2-1)$ nibble$_j \rightarrow$ segment$_{(j+i)}$ $0<j<(m_2-1)$ where: (j+i) represents a modulo-2 addition, and i and j are integer indices.

4. The apparatus in claim 3 wherein $m_2$ equals $2^p$, where p is a predetermined positive integer.

5. The apparatus in claim 4 where n=16 and $m_1=m_2=4$.

6. The apparatus in claim 2 wherein each of said memory segments is fabricated from synchronous dynamic random access memory circuits.

7. The apparatus in claim 2 further comprising an address bus connected to all of the segments and said data shuffling circuit for carrying said memory read and memory write words therebetween.

8. The apparatus in claim 7 wherein the data shuffling circuit comprises first and second barrel shifters, wherein the first barrel shifter re-arranges the n-byte input word into the memory write word, and the second barrel shifter re-arranges the memory read word into the n-byte output word.

9. The apparatus in claim 8 wherein the first barrel shifter comprises a plurality of first multiplexors wherein each input to each of the first multiplexors receives pixel data in a corresponding nibble of the n-byte input word and all the first multiplexors, in response to common write select signals applied thereto, form the entire n-byte memory write word, with the positional offset between successive nibbles, for storage across corresponding segments in the memory circuit.

10. The apparatus in claim 8 wherein the second barrel shifter comprises a plurality of second multiplexors, all of the second multiplexors being responsive to common read select signals applied thereto, wherein inputs to each of the second multiplexors receives a nibble of pixel data from each different one of the memory segments and each one of the second multiplexors selects a corresponding nibble of pixel data produced as output by one of the memory segments so as to re-arrange the nibbles of pixel data produced by all of the memory segments and in said memory read word so as to yield the n-byte output word.

11. The apparatus in claim 10 wherein the second barrel shifter, in response to the read select signals, re-arranges the nibbles in said memory read word to simultaneously yield either one of the sub-blocks or a scan line of pixel data in the image.

12. A receiver for high definition television (HDTV) comprising:
   a tuner for converting a desired incoming HDTV signal to a baseband signal;
   a demodulator and transport decoder for extracting HDTV information from the baseband signal and generating coded audio and digital information;
   audio circuitry, responsive to said coded audio information, for reproducing sound components of said HDTV signal;
   a video decoder and video display, responsive to said coded video information, for generating a decoded video signal on a macroblock-by-macroblock basis and for displaying said decoded video signal on a raster scan basis on the display, said video decoder having a video frame store memory for storing said decoded video signal on a macroblock-by-macroblock basis within said memory so as to form stored pixel data and accessing said stored pixel data on both said block-by-block basis and on a raster scan basis, said video frame store memory comprising:
      a memory circuit for storing n-byte wide words and having $m_2$ independent segments, each segment storing $m_1$-byte wide nibbles, wherein each of said n-byte words contains pixel data for a corresponding one of a plurality of ($m_1$-by-$m_2$) arrays of pixels, each of said arrays representing a corresponding one of a plurality of sub-blocks of one of the macroblocks in the image, the memory circuit containing each of the $m_2$ nibbles, in a common corresponding one of the sub-blocks, distributed across the $m_2$ memory segments with a predefined positional offset between successive ones of the $m_2$ nibbles stored in successive ones of the segments, and wherein each of the memory segments is simultaneously accessed, on either a read or write basis and with a corresponding memory address, to respectively read a nibble from each of the segments so as to collectively form an n-byte memory read word or to write a nibble into each of said memory segments from collectively an n-byte memory write word (where n, $m_1$ and $m_2$ are all pre-defined integers with $n=(m_1 \times m_2)$); and
      a data shuffling circuit, connected to the memory segments, for rearranging, in a corresponding pre-defined nibble-wise fashion, for a memory write operation an n-byte input word into the memory write word and, for a memory read operation, the memory read word into a properly ordered n-byte output word, wherein said output word contains pixel data for either one of said sub-blocks or a scan line in the image.

13. The apparatus in claim 12 wherein the pre-determined positional offset is a modulo-2 positional offset.

14. The apparatus in claim 13 wherein distribution of the nibbles across the $m_2$ memory segments occurs in accordance with the following equation:
   for sub-block$_i$: $0<i<(m_2-1)$
   nibble$_j \rightarrow$ segment$_{(j+i)}$ $0<j<(m_2-1)$
   where: (j+i) represents a modulo-2 addition, and i and j are integer indices.

15. The apparatus in claim 14 wherein $m_2$ equals $2^p$, where p is a predetermined positive integer.

16. The apparatus in claim 15 where $n=16$ and $m_1=m_2=4$.

17. The apparatus in claim 13 wherein each of said memory segments is fabricated from synchronous dynamic random access memory circuits.

18. The apparatus in claim 13 further comprising an address bus connected to all of the segments and said data shuffling circuit for carrying said memory read and memory write words therebetween.

19. The apparatus in claim 18 wherein the data shuffling circuit comprises first and second barrel shifters, wherein the first barrel shifter re-arranges the n-byte input word into the memory write word, and the second barrel shifter re-arranges the memory read word into the n-byte output word.

20. The apparatus in claim 19 wherein the first barrel shifter comprises a plurality of first multiplexors wherein each input to each of the first multiplexors receives pixel data in a corresponding nibble of the n-byte input word and all the first multiplexors, in response to common write select signals applied thereto, form the entire n-byte memory write word, with the positional offset between successive nibbles, for storage across corresponding segments in the memory circuit.

21. The apparatus in claim 19 wherein the second barrel shifter comprises a plurality of second multiplexors, all of the second multiplexors being responsive to common read select signals applied thereto, wherein inputs to each of the second multiplexors receives a nibble of pixel data from each different one of the memory segments and each one of the second multiplexors selects a corresponding nibble of pixel data produced as output by one of the memory segments so as to re-arrange the nibbles of pixel data produced by all of the memory segments and in said memory read word so as to yield the n-byte output word.

22. The apparatus in claim 21 wherein the second barrel shifter, in response to the read select signals, re-arranges the nibbles in said memory read word to simultaneously yield either one of the sub-blocks or a scan line of pixel data in the image.

23. A memory circuit containing stored image data for access therefrom by a memory interface, said memory circuit organized to store n-byte wide words and having $m_2$ independent segments, wherein pixel data for a corresponding one of a plurality of ($m_1$-by-$m_2$) arrays of pixels is stored within each of said n-byte words, each of said arrays representing a corresponding one of a plurality of sub-blocks of pixel data for the image, and each of the $m_2$ nibbles, in a common corresponding one of the sub-blocks of the pixel data is stored within the memory circuit and distributed across the $m_2$ memory segments therein with a predefined positional offset, within the memory circuit, occurring between successive ones of the $m_2$ nibbles stored in successive ones of the segments (where n, $m_1$ and $m_2$ are all pre-defined integers with n=(m1×m2)).

24. The apparatus in claim 23 wherein the pre-determined positional offset is a modulo-2 positional offset.

25. The apparatus in claim 24 wherein distribution of the nibbles across the $m_2$ memory segments occurs in accordance with the following equation:

for sub-block$_i$: $0<i<(m_2-1)$
  nibble$_j$→segment$_{(j+i)}$ $0<j<(m_2-1)$
  where: (j+i) represents a modulo-2 addition, and i and j are integer indices.

26. The apparatus in claim 25 wherein $m_2$ equals $2^p$, where p is a predetermined positive integer.

27. The apparatus in claim 24 where n=16 and $m_1=m_2=4$.

28. The apparatus in claim 24 wherein each of said memory segments is fabricated from synchronous dynamic random access memory circuits.

29. In a frame store memory having a memory circuit for storing n-byte wide words and having $m_2$ independent segments, each segment storing $m_1$-byte wide nibbles, wherein each of said n-byte words contains pixel data for a corresponding one of a plurality of ($m_1$-by-$m_2$) arrays of pixels, each of said arrays representing a corresponding one of a plurality of sub-blocks of pixel data for an image, the method comprising the steps of:

distributing each of the $m_2$ nibbles, in a common corresponding one of the sub-blocks, across the $m_2$ memory segments with a predefined positional offset between successive ones of the $m_2$ nibbles stored in successive ones of the segments;

accessing each of the memory segments, on either a read or write basis and with a corresponding memory address, to respectively read a nibble from each of the segments so as to collectively form an n-byte memory read word or to write a nibble into each of said memory segments from collectively an n-byte memory write word (where n, $m_1$ and $m_2$ are all pre-defined integers with n=($m_1=m_2$)); and rearranging, in a corresponding pre-defined nibble-wise fashion, for a memory write operation an n-byte input word into the memory write word and, for a memory read operation, the memory read word into a properly ordered n-byte output word, wherein said output word contains pixel data for either one of said sub-blocks or a scan line in the image.

30. The method in claim 29 wherein all of said memory segments are accessed simultaneously.

31. The method in claim 30 wherein the pre-determined positional offset is a modulo-2 positional offset.

32. The method in claim 31 wherein distribution of the nibbles across the $m_2$ memory segments occurs in accordance with the following equation:

for sub-block$_i$: $0<i<(m_2-1)$
  nibble$_j$→segment$_{(j+i)}$ $0<j<(m_2-1)$
  where: (j+i) represents a modulo-2 addition, and i and j are integer indices.

33. The method in claim 32 wherein $m_2$ equals $2^p$, where p is a predetermined positive integer.

34. The method in claim 33 where n=16 and $m_1=m_2=4$.

* * * * *